United States Patent Office 2,794,003
Patented May 28, 1957

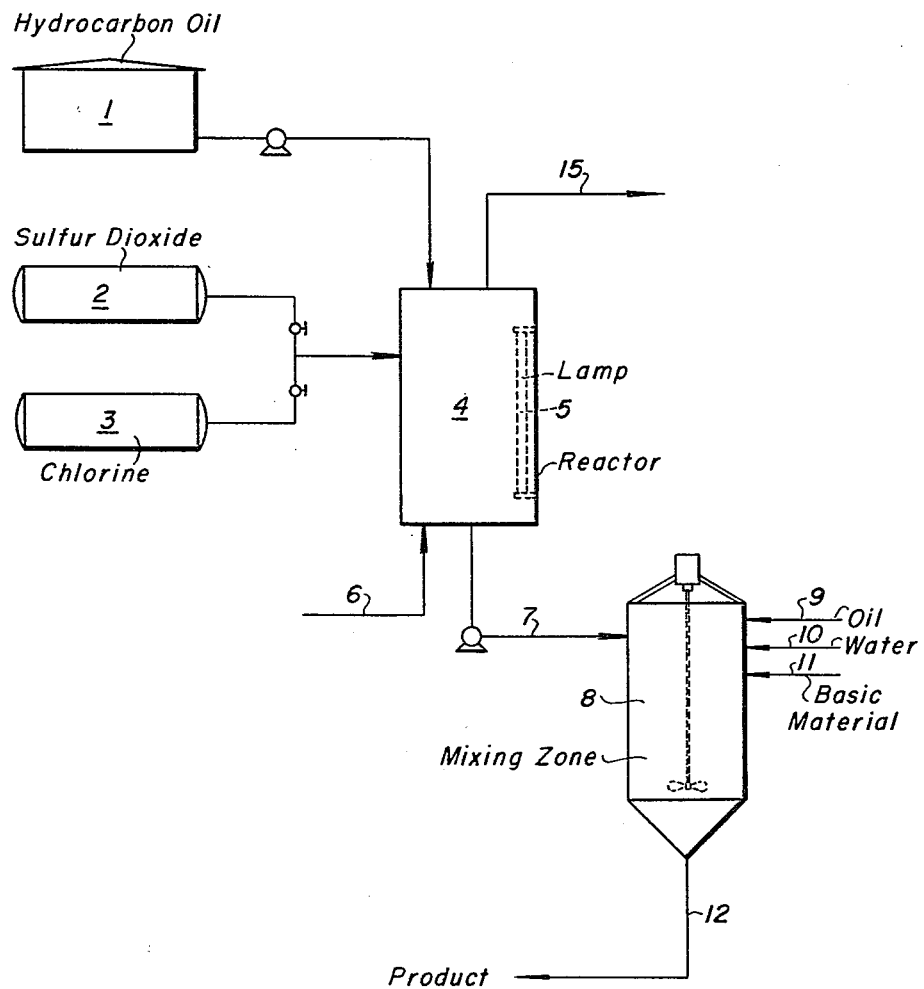

2,794,003

PREPARATION OF GEL COMPOSITIONS

Harry E. Cier and Henry G. Schutze, Baytown, Tex., assignors, by mesne assignments, to Esso Research and Engineering Company, Elizabeth, N. J., a corporation of Delaware Application October 7, 1954, Serial No. 460,962

13 Claims. (Cl. 252—316)

This invention is concerned with gel compositions of a novel nature and the technique by which such compositions are prepared. The invention involves the preparation of gelation agents constituting the metal derivatives of sulfonyl chlorides of saturated hydrocarbons. These novel gelation agents may be derived from saturated hydrocarbons for use in gelling particular compositions or may be prepared in situ employing hydrocarbons which are to be converted to a gel composition.

The present invention primarily concerns hydrocarbon gel compositions although the invention embraces gels prepared from halogenated hydrocarbons. Gels of this general nature are useful for a variety of purposes including use as incendiary fuel compositions, solid fuels for heating, for use as cleansing purposes, or for use in oil well operations where formations are fractured by applying pressure to a gel introduced to the formation. The present invention is concerned with preparation of gel compositions for uses of this character employing a novel technique for producing the gelation agent and for using this agent to prepare the final gel composition. One of the features of this invention is the derivation of gelation agents from hydrocarbon sulfonyl chlorides which are oil soluble and can be readily incorporated in material to be gelled. By incorporation of such sulfonyl chlorides in the composition to be gelled, the final gel composition can be prepared by a simple mixing step employing water and a basic metallic compound or aluminum metal. Another feature of this invention is the possibility of forming the gelation agent from the hydrocarbon to be gelled, making it possible for the first time to prepare a gel composition without employing extraneously derived gelation agents. These and other features of the invention will become apparent from the following description of the invention.

The hydrocarbon sulfonyl chloride employed as an intermediate in the formation of the gel compositions of this invention can be derived from saturated hydrocarbons having at least 7 carbon atoms. In particular the hydrocarbon sulfonyl chlorides may be formed by the sulfochlorination of paraffinic and naphthenic hydrocarbon compounds. The particular hydrocarbons from which the sulfonyl chlorides are prepared are best chosen with regard to the precise metal which is employed in subsequently forming a metal derivative of the hydrocarbon sulfonyl chloride. When an alkali metal derivative is to be prepared, the hydrocarbon employed for forming the sulfonyl chloride is preferably a $C_7$ to $C_{16}$ hydrocarbon. These hydrocarbons include the paraffins, naphthenic hydrocarbons, and alkyl substituted naphthenes having a number of carbon atoms in the range stated. When an alkaline earth metal derivative of a hydrocarbon sulfonyl chloride is employed in the practice of this invention, it is preferred to employ those hydrocarbons of the class indicated having more than 10 carbon atoms. In the event the metal derivative of the hydrocarbon sulfonyl chloride is that of aluminum, it is preferred that the hydrocarbon used for preparing a sulfonyl chloride is a paraffinic hydrocarbon having greater than 6 carbon atoms ranging upwardly to paraffin wax hydrocarbons.

Sulfo-chlorination of the paraffinic and naphthenic hydrocarbons referred to is preferably carried out by employing a photo-chemical reaction. In this reaction, the hydrocarbon is reacted with sulfur dioxide and chlorine by exposure to light. Temperatures which may be employed are in the range of about 60 to 200° F. and a temperature of about 150° F. is generally preferred. Pressure maintained during sulfo-chlorination preferably constitutes atmospheric pressure but elevated pressures can be employed. In general, the time of reaction required to form the hydrocarbon sulfonyl chlorides in the presence of light is in the range of about 15 minutes to 360 minutes. Employing relatively low energies of light activation, satisfactory results have been obtained at reaction times of about 90 minutes. Sulfo-chlorination of the paraffinic and naphthenic hydrocarbons identified occurs readily under these conditions to form the desired hydrocarbon sulfonyl chloride.

The gelation agents employed in this invention constitute the alkali metal, alkaline earth metal and aluminum derivatives of the hydrocarbon sulfonyl chlorides described. Formation of such derivatives can be carried out in a variety of ways but depends on the elimination of chlorine from the sulfonyl chloride accompanied by the addition of the metal ion to the compound. This reaction occurs readily since the hydrocarbon sulfonyl chlorides are acidic in character so that use of basic metal compounds causes the reaction to occur readily. In general, a convenient technique for preparing the desired metal derivative of the hydrocarbon sulfonyl chloride involves contact of the sulfonyl chloride with an aqueous solution of a water soluble basic metal compound. Thus, in the case of the alkali metal derivatives of hydrocarbon sulfonyl chlorides, these can be readily prepared by contacting the sulfonyl chloride with aqueous solutions of alkali metal hydroxides. Similarly, in the case of alkaline earth metal derivatives, these may be prepared by employing alkaline earth metal hydroxides which are sufficiently soluble in water so that the reaction can be secured in the same manner. When preparing aluminum derivatives of the hydrocarbon sulfonyl chlorides special techniques are preferred. In this case it is convenient to employ pure aluminum metal, provided as either a thin foil or a powder, in the presence of a small amount of an activator constituting either metallic mercury or a soluble mercury salt, such as mercuric chloride. The aluminum reacts readily with a hydrocarbon sulfonyl chloride to form the desired aluminum derivative of the sulfonyl chloride. This reaction is exothermic so that formation of the aluminum derivative must be carried out with adequate cooling facilities.

The metal derivatives of the hydrocarbon sulfonyl chloride may also be formed by a stepwise substitution process. In this case, an alkali metal derivative of sulfonyl chloride is first prepared by the technique described above. Thereafter by mixing the product of this reaction with a water soluble salt of the alkaline earth metals or aluminum a substitution reaction will occur resulting in the precipitation of the alkaline earth metal or aluminum derivative of the hydrocarbon sulfonyl chloride.

Formation of the metal derivative of the hydrocarbon sulfonyl chloride as described can be carried out at ambient temperatures and atmospheric pressure. In general, the reaction occurs readily so that reaction times of less than 5 minutes are adequate. Provision should be made to dissipate the heat of reaction. Of the metal derivatives referred to, those which are particularly preferred for the practice of this invention are the sodium, potassium, calcium, barium and aluminum derivatives of hydrocarbon sulfonyl chlorides. Of these the aluminum derivatives of hydrocarbon sulfonyl chlorides are particularly preferred by virtue of unique properties of this compound.

Reaction of the basic metal compounds with hydrocarbon sulfonyl chlorides forms metal derivatives including a variety of possible compounds. In the case of the alkali metal and alkaline earth metal derivatives, formation of metal sulfonates has been definitely established. These sulfonates, however, may constitute different combinations of the hydrocarbon radical, sulfur oxygen and the metal. In the case of aluminum metal, formation of a compound having the probable formula: $Al(RSO_2)x$ has been established, although again it is probable that a variety of different molecular compounds are obtained. Because of the impossibility of adequately identifying these reaction products, throughout the specification and claims of this patent, reference will be made to the "metal derivatives of hydrocarbon sulfonyl chlorides" in identifying these.

As indicated, the formation of the metal derivatives of hydrocarbon sulfonyl chlorides can be considered a neutralization reaction. The amount of basic metal compound employed in this neutralization reaction is not particularly critical in securing a gelation agent. Thus, it has been found practical to employ far less than the amount of basic compound required to completely neutralize the hydrocarbon sulfonyl chloride. This is practical and in some cases desirable in the practice of this invention by virtue of the fact that the hydrocarbon sulfonyl chloride is hydrocarbon or oil soluble so that any unreacted hydrocarbon sulfonyl chloride is unobjectionable in the formation of the final gel composition.

In using the metal derivatives of saturated hydrocarbon sulfonyl chlorides as gelation agents, it is only necessary to mix these derivatives with the composition to be gelled together with water. In general, the amount of metal derivative to be employed is to be chosen from the range of about 0.1% up to about 45%. The precise amount of metal derivative to be used depends in part upon the particular metal involved. Thus, it has been found that good gel compositions can be obtained by using relatively small amounts of aluminum derivatives and relatively large amounts of calcium or barium derivatives within the range stated. The amount of water required to form a gel with the agents of this invention is generally in the range of a trace up to about 23%. When employing the calcium and aluminum derivatives of hydrocarbon sulfonyl chlorides it becomes particularly practical to form gel compositions in the presence of extremely small quantities of water amounting to no more than a trace. Again, for example, when the sodium derivative of hydrocarbon sulfonyl chloride is employed, gels can be prepared when employing as much as 23% of water. As indicated, therefore, the precise proportions of the metal derivative and water used in forming a gel product depend in part on the particular metal derivative employed. Practically it is necessary to empirically determine the proportions of these constituents to obtain a gel having the desired characteristics. For most purposes, however, use of water in proportions of about 0.1 to 5%, and use of the metal derivative in proportions of about 1 to 5%, are particularly preferred in forming gels.

The gelation agents of this invention, in combination with water, in the proportions indicated can be used for forming gels from a wide variety of hydrocarbon compositions. For example, crude petroleum or any fractions of crude petroleum may be gelled. Specific hydrocarbons including the aromatic, paraffinic and naphthenic hydrocarbons may also be gelled employing the techniques of this invention. In general, however, it is preferred for most applications to form gels from specific petroleum fractions such as the gasoline, kerosene, gas oil, heating oil or lubricating oil fractions. For particular applications, this invention can also be used in forming gels from halogenated hydrocarbon compositions. As illustrative of this feature of the invention, gels have been successfully formed from carbon tetrachloride. It is to be understod, therefore, that the present invention is broadly of application to the formation of gels from substantially any liquid hydrocarbon.

As described, therefore, this invention concerns the formation of a gel composition employing an alkali metal, alkaline earth metal or aluminum derivative of a saturated hydrocarbon sulfonyl chloride. This metal derivative is mixed with water and the liquid hydrocarbon composition to be gelled while agitating this mixture until the gel structure is established.

In order to fully disclose the principles of this invention, reference is made to the accompanying drawing which diagrammatically illustrates a flow plan embodying the invention.

Referring to the drawing, the hydrocarbon from which the hydrocarbon sulfonyl chloride is to be formed is stored in storage vessel 1. As indicated, this hydrocarbon will constitute a paraffinic or naphthenic hydrocarbon having greater than 7 carbon atoms. Sulfur dioxide from vessel 2 and chlorine from vessel 3 are brought together with the hydrocarbon in the reaction zone 4. Reaction zone 4 is equipped to permit conduct of the necessary photochemical reaction. For this purpose a lamp 5 is maintained in the reactor so that the hydrocarbon, sulfur dioxide and chlorine will be exposed to actinic energy. Reaction of these constituents causes formation of the hydrocarbon sulfonyl chloride which is retained in the reaction zone while unreacted gases passing through the reactants and product are removed from reactor 4 through line 15. Complete removal of unreacted sulfur dioxide and chlorine from the hydrocarbon sulfonyl chloride product may be carried out in zone 4 by introducing an inert gas such as nitrogen through line 6 to pass upwardly through the sulfonyl chloride product for removal through line 15. Other techniques such as water washing or the like may be used for stripping unreacted gases from the product.

The hydrocarbon sulfonyl chloride product is removed from reaction zone 4 through line 7 and is passed to agitation zone 8. The hydrocarbon oil which it is desired to gel will be brought into zone 8 through line 9 together with water through line 10 and the basic metallic compound through line 11. Mixing of these components with the hydrocarbon sulfonyl chloride results in the formation of the desired gel product which can be removed from zone 8 through line 12.

It will be apparent to those skilled in the art that the flow plan illustrated is subject to many modifications and refinements within the concept of this invention. For example, the hydrocarbon sulfonyl chloride product formed in zone 4 can, if desired, be subjected to additional purification steps to separate unreacted hydrocarbons. Again, for example, as indicated in the preceding description, the sulfonyl chloride may first be reacted with a basic metal material to form the metal derivative of the hydrocarbon sulfonyl chloride prior to admixture with oil and water. In this same connection the metal derivative obtained from this reaction may, if desired, be subjected to refining and purification steps prior to admixture with the oil to be gelled. It is to be understood, therefore, that the flow plan described is employed to illustrate one of the many embodiments of the invention.

In connection with the process particularly illustrated in the drawing, it is of particular interest to note that the oil composition to be gelled introduced through line 9 of the drawing may be of the same composition as the hydrocarbon used as a feed stock in the preparation of the sulfonyl chloride intermediate. For example, in the event it is desired to form a gelled naphtha, the sulfonyl chloride can be formed from the naphtha by contact with sulfur dioxide and chlorine as described. This feature of the invention eliminates the necessity for derivation of gelation agents from any extraneous hydrocarbon source as heretofore required.

In order to demonstrate the utility of this invention, reference will be made to exemplary experiments demonstrating the principles of the invention:

EXAMPLE I

In a first series of experiments, gel compositions were formed by producing the novel gelation agent of this invention in situ in the hydrocarbon composition to be gelled. In these experiments, a variety of liquid hydrocarbons were employed including normal heptane, jet fuel, and crude oil. In order to form gel compositions, particular amounts of sodium hydroxide, water and heptyl sulfonyl chloride were mixed with the indicated hydrocarbon compositions. The heptyl sulfonyl chloride was obtained by the photochemical reaction of sulfur dioxide and chlorine, conducted to achieve a conversion of 28% by weight of heptyl sulfonyl chloride. The total products of this reaction were used in obtaining the data of Table I. Mixing was carried out under conditions of gentle agitation until the gel had formed. The results of these experiments are shown in Table I below:

*Table I.—Gel compositions employing the sodium derivative of heptyl sulfonyl chloride formed in situ*

| Gel | Grams Sulfonyl Chloride | Type | Grams | Grams 50° Bé NaOH | Grams Water |
|---|---|---|---|---|---|
| A | 112 | N-Heptane | 64 | 18 | 6 |
| B | 111 | do | 62 | 9 | 10 |
| C | 111 | Jet Fuel | 62 | 9 | 10 |
| D | 112 | do | 128 | 15 | 10 |
| E | 112 | do | 128 | 15 | 10 |
| F | 112 | do | 400 | 15 | 10 |
| G | 112 | do | 64 | 15 | 10 |
| H | 112 | do | 64 | 15 | 10 |
| I | 112 | Crude Oil | 64 | 15 | 10 |
| J | 112 | Jet Fuel | 64 | 15 g. KOH | 10 |

As indicated in the table, in every case a good gel structure was formed. In the case of gels G and H, after gels had been formed as indicated in the table, additional jet fuel was added to the gels in amounts of 336 and 840 grams respectively together with 13.6 grams of aluminum stearate in each case. Good gel structures were maintained. In general, the aluminum stearate cooperated to provide a thicker and more stable gel although use of aluminum sterate is an optional feature. Data relating to formation of a gel from crude oil is exemplary of one phenomenon characteristic of the present invention. A gel was initially formed using 64 grams of crude oil as shown in the table after which additional crude oil was introduced to the gel with continued agitation. A stiff gel structure was maintained until substantially more than 935 grams of crude oil had been added to the gel. This data brings out the small amount of gelation agent required in attaining suitable gels.

EXAMPLE II

In a second series of experiments, a variety of gels were prepared in which in employing the sodium derivative of heptyl sulfonyl chloride and the sodium derivative of methyl cyclo hexyl chloride. The experiments were particularly conducted employing a variety of proportions of the sodium derivative, water and naphtha. In addition, experiments were conducted to form gels from halogenated hydrocarbons including carbon tetrachloride and benzyl chloride. The naphtha employed in these experiments had the following inspections:

Gravity, ° API _____ 48.1
Kerosene distillation:
  FBP _____ 327
  2% _____ 331
  5% _____ 332
  10% _____ 333
  20% _____ 336
  30% _____ 338
  40% _____ 340
  50% _____ 343
  60% _____ 346
  70% _____ 350
  80% _____ 356
  90% _____ 357
  95% _____ 382
  Dry point _____ 389
  F. B. P. _____ 404

These gel compositions formed are summarized in Table II below:

*Table II.—Gel compositions employing the preformed sodium derivative of heptyl sulfonyl chloride (A) and of methyl cyclo hexyl sulfonyl chloride (B)*

| Grams | Type | Grams | Water, Grams |
|---|---|---|---|
| 10A | Naphtha | 50 | 3 |
| 10A | do | 50 | 3 |
| 10A | CCl$_4$ | 50 | 2.5 |
| 10A | C$_6$H$_5$Cl | 50 | 3.5 |
| 50A | Naphtha | 450 | 5 |
| 50A | Naphtha / CCl$_4$ | 225 / 225 | 6 |
| 50A | Naphtha / CCl$_4$ | 113 / 337 | 8 |
| 50A | Naphtha / CCl$_4$ | 113 / 337 | 8 |
| 50A | Naphtha / CCl$_4$ | 113 / 337 | 8 |
| 50A | Naphtha / CCl$_4$ | 113 / 337 | 8 |
| 50A | Naphtha / CCl$_4$ | 113 / 337 | 8 |
| 100A | Naphtha / CCl$_4$ | 100 / 300 | 10 |
| 10B | Naphtha | 50 | 2 |
| 25B | do | 50 | 2.5 |
| 35B | do | 50 | 2.5 |
| 36B | do | 36 | 2 |
| 50B | do | 160 | 13.5 |
| 25B | do | 33 | 6 |
| 50B | do | 60 | 8 |
| 50B | do | 109 | 8 |
| 10B | do | 50 | 2 |
| 10B | C$_6$H$_5$Cl | 50 | 5 |
| 10B | CCl$_4$ | 50 | 4 |
| 10B | CCl$_4$ | 50 | 5 |

In every case shown in this table, employing the varying proportions of the different constituents, stable gels were obtained.

EXAMPLE III

In still another series of experiments, the calcium derivative of hydrocarbon sulfonyl chlorides was employed as a gelation agent. In these experiments, cetane was photochemically sulfo-chlorinated by reaction with sulfur dioxide and chlorine in the presence of light. Reaction was conducted to obtain a conversion of about 68% of the cetane. This was carried out by contacting 2800 grams of cetane with 1000 ccs. per minute of SO$_2$ and 600 ccs. per minute of chlorine at a temperature of about 110° F. in the presence of a mercury vapor light. At the end of 5½ hours the stated conversion of the cetane was attained.

The cetane sulfonyl chloride was first contacted with sodium hydroxide to form the sodium derivative of the cetane sulfonyl chloride. Thereafter calcium chloride was mixed with this reaction product resulting in the precipitation of the calcium derivative of cetane sulfonyl chloride. In a typical experiment, 10 grams of the calcium derivative was mixed with 50 grams of the naphtha formerly identified together with 0.1 gram of water. A stiff gel was successfully formed.

EXAMPLE IV

In a similar manner the calcium derivative of a hydrocarbon sulfonyl chloride derived from wax was prepared. 10 grams of this calcium derivative were mixed with 50 grams of the naphtha identified and a firm gel was successfully obtained. In this case sufficient moisture from the preparation of the calcium derivative was entrained to provide the necessary water content for gel formation.

EXAMPLE V

Experiments were also conducted to form gel compositions employing an aluminum derivative of hydrocarbon sulfonyl chloride. In this case heptane was sulfo-chlorinated photochemically in order to provide heptyl sulfonyl chloride constituting a mixture of heptane containing 22.6 weight percent of the sulfonyl chloride. The sulfonyl chloride was contacted with aluminum foil in the presence of a small amount of mercuric chloride. In a first experiment 30 grams of the sulfonyl chloride were contacted with one gram of aluminum and about 0.1 to 0.2 gram of mercuric chloride. This mixture was refluxed for about 3 hours, diluted with naphtha and filtered. Together with the naphtha employed, 100 ccs. of reactants were obtained. 50 cc. of these reactants were then mixed with 500 grams of the naphtha formerly identified together with 4½ grams of water and a gel was successfully obtained. Similar experiments were conducted employing different proportions of the aluminum derivative, naphtha and water. In each case it was possible to successfully secure a gelled naphtha product.

It may be observed of the gel compositions referred to in the preceding experiments, the aluminum gels prepared from naphtha appear to be particularly suitable for use as incendiary gel compositions.

What is claimed is:

1. A method for gelling a liquid selected from the class consisting of liquid hydrocarbons and halogenated hydrocarbons which comprises adding to said liquid, with agitation, a gel forming amount within the range of about 0.1 to about 23 percent of water and a product obtained by mixing an oil soluble saturated hydrocarbon sulfonyl chloride, said saturated hydrocarbon containing more than about 6 carbon atoms per molecule and ranging upwardly to paraffin wax hydrocarbons with less than a stoichiometric amount of a basic inorganic compound of a metal selected from the group consisting of sodium, potassium, calcium and aluminum, said amount of basic compound being sufficient to provide a gel forming amount within the range of about 0.1 to about 45 percent of a metal derivative of said sulfonyl chlorides.

2. A method as in claim 1 in which the said liquid is a petroleum hydrocarbon.

3. A method as in claim 1 in which the said liquid is carbon tetrachloride.

4. The process defined by claim 1 in which the said liquid is benzyl chloride.

5. A method as in claim 1 wherein the saturated hydrocarbon sulfonyl chlorides contain from about 7 to 16 carbon atoms and wherein the basic compound is sodium hydroxide, said sodium hydroxide being added to said hydrocarbon sulfonyl chlorides in aqueous solution.

6. A method as in claim 1 wherein the saturated hydrocarbon sulfonyl chlorides contain more than about 10 carbon atoms and wherein the basic compound is calcium hydroxide, said calcium hydroxide being added to said sulfonyl chlorides in admixture with water.

7. A method as in claim 1 wherein the basic compound is aluminum and wherein the aluminum is added to the sulfonyl chlorides in the presence of a mercury-containing activator.

8. A method for gelling a liquid selected from the class consisting of liquid hydrocarbons and halogenated hydrocarbons which comprises the steps of sulfo-chlorinating an oil soluble hydrocarbon of more than 6 carbon atoms selected from the group consisting of liquid paraffinic and naphthenic hydrocarbons having more than about 6 carbon atoms and ranging upwardly to paraffin wax hydrocarbons to form a product containing hydrocarbon sulfonyl chlorides, and thereafter mixing said sulfonyl chloride product with said liquid to be gelled with agitation in the presence of a gel forming amount within the range of about 0.1 to 23 percent of water and an inorganic basic compound of a metal reactable with said hydrocarbon sulfonyl chloride to form a metal derivative thereof, said metal being selected from the group consisting of sodium, potassium, calcium and aluminum, the amount of said basic metal compound employed being less than the stoichiometric amount required for reaction with said hydrocarbon sulfonyl chlorides, said amount of said basic metal compound being sufficient to provide a gel forming amount within the range of about 0.1 to about 45 percent of a metal derivative of said sulfonyl chloride, whereby a gel substantially free from inorganic bases comprising said metal is obtained.

9. A method of preparing a gel from a saturated liquid hydrocarbon of more than 6 carbon atoms selected from the group consisting of liquid paraffinic and naphthenic hydrocarbons having more than 6 carbon atoms and ranging upwardly to paraffin wax hydrocarbons which comprises first sulfochlorinating said hydrocarbon liquid to convert a portion thereof to a hydrocarbon sulfonyl chloride and to obtain a hydrocarbon sulfonyl chloride-containing first product from said liquid, next mixing said first product with an amount of an inorganic basic compound of a metal sufficient to form a gel forming amount within the range of about 0.1 to 45 percent of a metal derivative by reaction of said basic compound with a portion of the hydrocarbon sulfonyl chlorides contained therein and to obtain a second product containing said derivative and sulfonyl chlorides, said metal being selected from the group consisting of sodium, potassium, calcium, and aluminum, and thereafter mixing a gel forming amount within the range of about 0.1 to 23 percent of water with said second product to form a gel, said gel being substantially free from inorganic bases comprising said metal.

10. A gel composition consisting essentially of a liquid selected from the group consisting of liquid hydrocarbons and halogenated hydrocarbons, a gel forming amount within the range of about 0.1 to 23 percent of water and a gellation agent consisting essentially of an oil soluble saturated hydrocarbon sulfonyl chloride, said saturated hydrocarbon having more than 6 carbon atoms and ranging upwardly to paraffin wax hydrocarbons, and about 0.1 to 45 percent of a metal derivative of said sulfonyl chloride, said metal derivative having been prepared by mixing less than a stoichiometric amount of an inorganic basic compound of a metal with said hydrocarbon sulfonyl chloride, said metal being selected from the group consisting of sodium, potassium, calcium and aluminum, said gel being substantially free from said basic metal compound.

11. The composition defined by claim 10 in which said metal is sodium and said sulfonyl chloride contains 7 to 16 carbon atoms.

12. The composition defined by claim 10 in which said metal is calcium and said sulfonyl chloride contains more than 10 carbon atoms.

13. The composition defined by claim 10 in which said metal is aluminum and said sulfonyl chloride is a paraffinic sulfonyl chloride.

References Cited in the file of this patent

UNITED STATES PATENTS 2,382,144    Griesinger _____ Aug. 14, 1945